Figure 1:
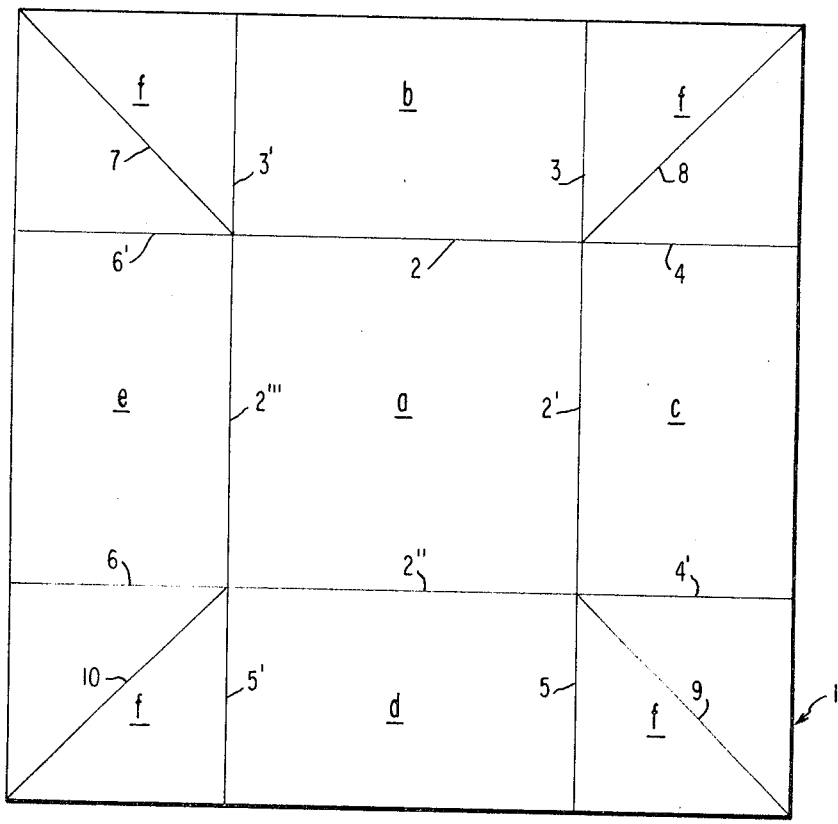

United States Patent
Uhl

[15] 3,637,335
[45] Jan. 25, 1972

[54] SOLID FUEL BLOCK HAVING A SELF-CONTAINED WICK

[72] Inventor: George A. Uhl, Markham, Ill.
[73] Assignee: Atlantic Richfield Company
[22] Filed: Sept. 4, 1969
[21] Appl. No.: 855,279

[52] U.S. Cl. ..............................................431/291, 44/40
[51] Int. Cl. ...........................................................F23d 3/16
[58] Field of Search ..................431/288, 291; 44/40, 41, 38; 126/59.5

[56] References Cited

UNITED STATES PATENTS

| | | |
|---|---|---|
| 3,327,505 | 6/1967 | Brown...................................431/288 |
| 3,367,758 | 2/1968 | Ambrose et al..........................44/40 |
| 3,428,410 | 2/1969 | Johnston et al....................126/59.5 X |
| 3,495,924 | 2/1970 | Doering et al. ....................126/59.5 X |

*Primary Examiner*—Carroll B. Dority, Jr.
*Attorney*—Morton, Bernard, Brown, Roberts & Sutherland and Thomas J. Clough

[57] ABSTRACT

A solid fuel block for use as a heat source in, for example, a fruit orchard, is disclosed. The solid fuel block is composed of a single, folded container enclosing a solid hydrocarbon fuel on the bottom and four sides. The folded-in corners of the container extend into the fuel and act as a wick.

3 Claims, 2 Drawing Figures

PATENTED JAN25 1972                     3,637,335

INVENTOR
GEORGE A. UHL

BY McLean, Morton & Boustead

ATTORNEYS

SOLID FUEL BLOCK HAVING A SELF-CONTAINED WICK

This invention relates to solid fuel blocks and their use as a source of heat for a variety of applications. More particularly, this invention concerns the combination of a solid hydrocarbon fuel, for instance wax, with a particular container to produce a heater especially useful for frost or freeze protection and for other purposes.

There is a need in many parts of the country for a means for supplying heat to citrus groves, fruit orchards, or vegetable farms to protect the crop against damage caused by frost or freezing. Three actions that may be taken in preventing crop damage due to frost and freezing involve the conservation of heat, mixing or stirring the air and the addition of heat. One of the most effective ways to protect crops from cold weather is to conserve heat by covering the area to be protected with cloth, paper, wood, glass, lathes, earth, brush, water flooding, etc. However, this procedure has proven to be impractical, especially in protecting large acreages. In any case, the degree of protection is limited and the labor cost is almost prohibitive. Irrigation and spraying with water has also proven to be undesirable. Although spraying crops with water does afford some protection, if it is discontinued before the air temperature rises above the danger point, ice may form on the trees, causing substantial damage. Orchard irrigation may cause temperatures to rise about 1.5° F., but this is usually insufficient to protect crops or trees.

Since the air temperature 40 feet above an orchard may be as much as about 7° to 10° F. higher than at 5 feet above the ground, stirring the air with fans has often proved to be beneficial. These fans or wind machines usually consist of a tower equipped with a single propeller driven by an electric motor or a gasoline or diesel engine. However, wind machines are not very effective against even a moderate, natural air drift. Further, if conditions for heavy frost or freezing exist, there is little or no increase in air temperature with elevation and, consequently, there is no warm air to mix with the cold surface air.

Most people who protect their crop against damages by freezing or frost do so by adding heat through the burning of various fuels. The addition of heat in this manner is based upon the principle of temperature inversion. On a clear, calm night there is a relatively thin layer of cold air near the ground and a gradual increase in air temperature up to a height of 300 to 800 feet. Hot gases from the burning fuel mix rapidly with the surrounding cold air to give a slightly increased ambient air temperature which rises slightly and acts as a roof over the area to be heated to retain the subsequently heated air.

One of the most important single factors in crop protection by heating is the amount of air movement near the ground. When the air is calm, a minimum number of heaters will raise the surface temperature appreciably. Air in motion steadily carries the heat away and a greater quantity of fuel must be consumed to obtain the same effect on surface temperature.

The addition of heat can be accomplished through the burning of either solid fuels or oil. Solid fuels include briquettes of coal or carbon, wood, oil saturated wood shavings, baled straw, automobile tires and a mixture of coal dust, asphalt, sawdust, niter and the like. Many of these items, however, are costly and the supply limited. Also, these fuels often give a large amount of soot and odor, and considerable labor is required for their use. Consequently, oil is a favorite fuel for frost protection. Oil used for this purpose varies from bunker grade marine diesel fuel (about 27° API) to highly refined distillates of say 37°–38° API. In certain parts of the country people are restricted to burning only distillate fuels in a "return stack-type heater," or other approved stoves. Fruit growers not affected by these requirements still use crude oil, crankcase drainings and other inexpensive fuels. However, these cheaper fuels cause smoke which deposits an oil soot on the crop thus impairing its marketability.

Because of the expense, inadequate heating, smoke and other problems associated with crop heating systems, the industry has tried to develop improved means for protecting crops from frost and freezing, as illustrated by U.S. Pat. Nos. 1,763,516; 2,435,520; 2,531,821; and 3,105,484. The devices of all of these patents use a liquid fuel such as an alcohol, fuel oil such as kerosene, or any relatively inexpensive oil or other liquid material. These fuels have the inherent limitations of being difficult to handle and burning very rapidly, often with a large amount of smoke. Orchard heater smoke has little or no influence on temperature and many, in fact, have a deleterious effect if it deposits sooty residues on citrus fruits or becomes obnoxious to the neighborhood.

U.S. Pat. No. 1,763,516 discloses a heating device formed of porous material, such as limestone or fire clay, containing two separate compartments for storing liquid fuel, one of which is filled with kerosene or a similar inflammable oil, and the other with a heavy oil such as a crude oil or a heavy fuel oil. In operation, kerosene penetrates to the outside of the porous container where it burns and the heat of combustion causes the heavier liquid oil to penetrate to the outside of the container and burn. As can be readily seen, this heater is very complicated in operation, produces undesirable smoke, is difficult to extinguish once the burner has been started and is expensive to produce and maintain.

U.S. Pat. No. 2,435,520 shows a flare composed of a porous ceramic material, the central portion of which acts as a wick for the liquid fuel contained therein. As can readily be observed, the small burning surface would have limited heating capacity and the fuel would be dissipated in a relatively short time. Also, it would appear that the heating capacity of the device would be continually decreased as the level of the fuel recedes, thereby reducing the surface area of the wick exposed to the liquid fuel. Both U.S. Pat. Nos. 2,531,828 and 3,105,484 disclose heaters consisting of a reusable container filled with an absorbent material impregnated with liquid fuel. The former patent uses asbestos fiber type absorbent material, whereas the latter patent uses absorbents such as rock wool, mineral wool, glass wool, vermiculite, etc. Upon ignition, all of the fuel would burn simultaneously causing a rapid use of the fuel and also making extinguishing of the fuel difficult. Thus, it is apparent that an improved heating device is needed which is inexpensive and easy to operate and which produces sufficient, essentially smokeless heat for a desired period of time.

U.S. Pat. No. 3,413,967 discloses a fuel block composed of a normally solid hydrocarbon wax encased in an open top porous container made of a light weight aggregate and a binder such as sodium silicate or portland cement.

The heating device of the present invention is a fuel block composed of a normally solid hydrocarbon wax encased in a container made from a single folded sheet of a flammable, solid sheet material such as cardboard, paperboard, etc., which exhibits sufficient flexibility to be folded but has sufficient strength and rigidity to form the container.

By using the wax fuel material in a container which functions as a wick to burn the fuel contained therein, a heater is provided which substantially satisfies the needs of the fruit and vegetable industry, that is, to protect crops against damage caused by frost and freezing. The wicking action of the container is essential to maintain burning of the fuel over an extended period of time, especially when there is appreciable air movement across the surface of the block, and most particularly, when the heating device is first ignited. Thus, the wax-container interface at the upper surface of the wax forms a stable flame source that maintains combustion even when a substantial wind is present.

Figure 2:
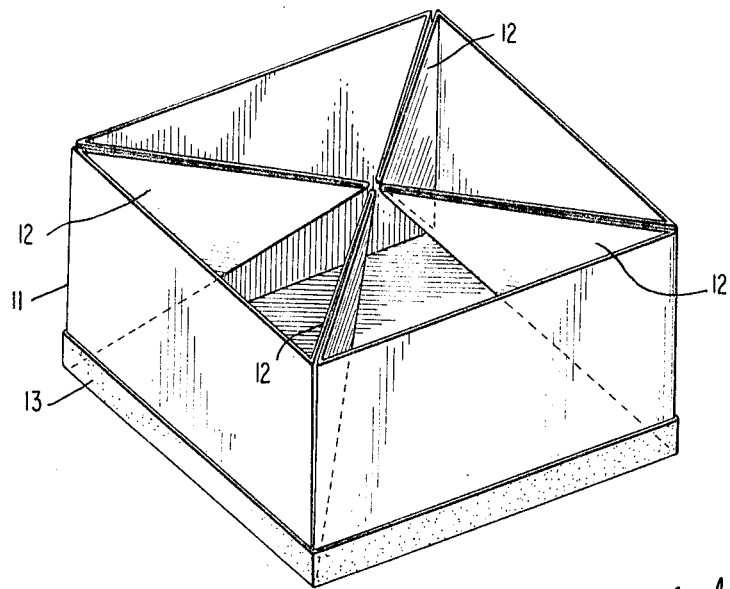

In the drawings:

FIG. 1 shows an unfolded sheet of container material with the fold lines indicated thereon; and FIG. 2 shows a solid fuel block of the invention.

As shown in FIG. 1, the prefolded container is a rectangular, single cellulosic sheet. Although the sheet is shown as a continuous, solid sheet, it can be formed from smaller pieces fitted together to form the desired shape and size and appropriately held together, as by means of adhesive, adhesive tape, staples or the like, to form a one-piece sheet. The sheet 1 is folded upwardly along the fold lines 2, 2', 2'', 2''', 3, 3', 4, 4', 5, 5', and 6, 6', and inwardly along the fold lines 7, 8, 9 and 10 to provide the container 11 as shown in FIG. 2.

The folds 2, 2', 2'' and 2''' define the base $a$ of the fuel block, while folds 3, 3', 4, 4', 5, 5', 6 and 6' define the four side panels $b, c, d$ and $e$, respectively of the fuel block. Each of the fold lines for the sides is, as shown, an extension of the fold lines defining the base. In this way, a rectangular container is obtained. The sheet material in each corner lying between the sides, indicated generally as $f$, is folded inwardly along the diagonal, between the corner of the base $a$ and the corner of sheet 1, as indicated at 7, 8, 9 and 10, respectively. This inward folding of the corner material provides four inwardly extending portions 12 which when encased in the fuel block provide the heating device with a self-contained wick.

The sheet 1 can be scored slightly to make folding easier. The inwardly extending corner portions 12 can be glued together, or a retaining member such as a wire or strap 13 can be placed around the outside of the container 11, preferably near the bottom. Also, the folds may be stapled or otherwise attached at the center of the container. The fuel material is preferably melted and poured into the folded container and allowed to harden, although preformed fuel blocks may be used and inserted within the container.

The materials used for making the containers of the present invention are fibrous composites such as cardboard, paperboard, or other cellulosic materials. Cardboard is particularly preferred because of its relatively high strength and low cost. The container can be coated on the outside with a fire retardant material such as sodium silicate to avoid burning away the container too rapidly.

The fuels which are used in making the solid fuel blocks of the present invention are generally those which melt at a temperature high enough so that they will not flow out of the container if the blocks are stored on their side at summer temperatures. These fuels in general are normally solid waxes and include predominantly waxy hydrocarbon products melting above say about 100° F., and thus include fully refined paraffin or microcrystalline waxes. The fuels, although consisting substantially of wax, may contain a minor amount, say up to about 30 percent or more by volume, of oil. A typical fuel which is obtained from light and medium slacks is foots oil which melts between about 115° and 125° F. A typical paraffin wax has a specific gravity (API) of about 34, a viscosity (SUS at 210° F.) of about 53, a melting point (ASTM) of about 141° F., and a percent oil content of 22.3.

One of the features of the present invention is the relatively easy ignition and extinguishing properties of the fuel block. The novel wicking action of the fuel container insures ready ignition and the flame can be extinguished by smothering and may be relit at any time.

It is also desired that the heater or fuel block give off a relatively even B.t.u. output as it burns down, and thus most advantageously the heater has a horizontal cross section which is essentially constant. The heat dissipation of the fuel block of the present invention can, therefore, be substantially uniform since the fuel and air supply are essentially constant throughout the burning period for a uniform air movement. The blocks are particularly effective in areas of the country where there is no temperature inversion and thus no warm air roof to hold the heat near the ground. In these situations it is important that the heaters deliver relatively constant heat from ignition until the flame is extinguished. It is also essential that the heaters be able to withstand the climatic conditions which exist during that period of time when the heaters are being used, generally, throughout the frost and freezing months. The fuel blocks of the present invention are substantially unaffected by the extremes of temperature conditions. In achieving the necessary B.t.u. requirements, the fuel often burns with about a 12 to 15 inch flame and with little smoke.

The solid fuel block heater of the present invention is relatively inexpensive to produce and can be properly sized to meet the necessary heat output required, depending upon the particular use. Frequently, the block is sized to expose an upper wax surface of at least about 0.15 square foot, and it may be sized up to about 5 square feet with convenience in handling being maintained; however, blocks of larger fuel cross-sectional dimensions may be made. The blocks can be stacked without any danger of spillage and can be stored indefinitely without any serious deterioration in the burning qualities of the burner. The fuel used is not subject to spontaneous combustion, and if storage temperatures rise above the melting point of the fuel, no difficulty is encountered except possibly spillage problems if it were necessary to move the containers at that particular time.

In use, the heater is ignited either manually or with a chemical igniter with the inwardly folded corners acting as a wick to establish full ignition of the fuel surface. As the fuel burns, the container walls burn away, as well as the inwardly folded corners so that very little of the container remains after burning out.

The usefulness of this type of heater is not restricted to orchard use and general crop use such as in vine yards, berry farms, vegetable farms and other field crops, but also finds application in construction work, winter resort areas such as ice skating rinks and ski slopes, various indoor applications and many other heating applications. The heaters of the present invention can also be used as standby equipment to supplement existing heating facilities.

I claim:

1. A solid fuel block heater comprising a normally solid hydrocarbon wax and an ignitable container within which said wax is enclosed, said container being formed from a single solid sheet (1) of flammable material folded along fold lines (2', 2'', 2''', 2'''') defining the base ($a$) of said fuel block, said fold lines defining the base ($a$) as a rectangular base, said sheet further being folded along fold lines (3, 3', 4, 4', 5, 5', 6, 6') defining upwardly extending sides ($b, c, d, e$), the last said fold lines defining the sides as rectangular sides, and said sheet further being folded along centerlines (7, 8, 9, 10) between the corners of said base ($a$) and corners of said sheet (1) to provide inwardly extending portions (12), said inwardly extending portions (12) defining a self-contained wick means.

2. The solid fuel block of claim 1 wherein said container is made of cardboard.

3. The solid fuel block of claim 2 wherein said cardboard is coated on the outside with a fire retardant material.

* * * * *

UNITED STATES PATENT OFFICE
CERTIFICATE OF CORRECTION

Patent No. 3,637,335          Dated January 25, 1972

Inventor(s) George A. Uhl

It is certified that error appears in the above-identified patent and that said Letters Patent are hereby corrected as shown below:

Column 4, Line 46, reads "(2', 2", 2", 2''')" should read
--(2, 2', 2", 2''')--

Signed and sealed this 3rd day of October 1972.

(SEAL)
Attest:

EDWARD M. FLETCHER, JR.                ROBERT GOTTSCHALK
Attesting Officer                       Commissioner of Patents